(12) United States Patent
Ko

(10) Patent No.: US 6,774,973 B2
(45) Date of Patent: Aug. 10, 2004

(54) LIQUID CRYSTAL DISPLAY PANEL OF LINE-ON GLASS TYPE

(75) Inventor: Tae Woon Ko, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 39 days.

(21) Appl. No.: 10/323,888

(22) Filed: Dec. 20, 2002

(65) Prior Publication Data

US 2003/0117571 A1 Jun. 26, 2003

(30) Foreign Application Priority Data

Dec. 22, 2001 (KR) .......................................... 2001-83237

(51) Int. Cl.[7] .................. G02F 1/1339; G02F 1/1345
(52) U.S. Cl. .................. 349/153; 349/190; 349/149
(58) Field of Search ................ 349/149, 153, 349/190

(56) References Cited

U.S. PATENT DOCUMENTS 5,739,880 A * 4/1998 Suzuki et al. ............... 349/110
5,995,189 A * 11/1999 Zhang ......................... 349/153
6,373,544 B1 * 4/2002 Hirabayashi ................ 349/149

* cited by examiner

*Primary Examiner*—Robert H. Kim
*Assistant Examiner*—Hoan C. Nguyen
(74) *Attorney, Agent, or Firm*—McKenna Long & Aldridge LLP

(57) ABSTRACT

This invention relates to a line-on-glass LOG type liquid crystal display panel that is capable of preventing the lack of hardening of a sealant and staining of the liquid crystal display panel. A liquid crystal display panel of a line-on glass type includes a picture display part having a plurality of liquid crystal cells formed between an upper substrate and a lower substrate, signal pads formed at the outer area of the picture display part for supplying driving signals inputted from an outer driver integrated circuit to the picture display part. Line-on-glass type signal lines are formed at the outer area by a line-on-glass method and supply voltage signals needed for driving the driver integrated circuit. A sealant formed on the outer area for joining the upper and lower substrate. A least one or more holes formed on line-glass-type signal lines at the area where the line-on-glass type signal lines overlap with the sealant allowing UV rays irradiated for hardening the sealant to pass through.

10 Claims, 2 Drawing Sheets

LIQUID CRYSTAL DISPLAY PANEL OF LINE-ON GLASS TYPE

This application claims the benefit of Korean Patent Application No. P2001-83237, filed on Dec. 22, 2001, which is hereby incorporated by reference for all purposes as if fully set forth herein.

BACKGROUND OF THE INVENTION

1. Field of the Invention

The present invention relates to liquid crystal displays, and more particularly to a line-on-glass (LOG) type liquid crystal displays that are capable of preventing deterioration of the picture caused by lack of hardening of a sealant formed on a liquid crystal display panel.

2. Discussion of the Related Art

Generally, liquid crystal displays (LCDs) use electric fields to control light transmittance characteristics of a layer of liquid crystal material. Accordingly, LCDs typically include a liquid crystal display panel having a plurality of liquid crystal cells arranged in a matrix pattern and a driver circuit for driving the plurality of liquid crystal cells to display a picture on the liquid crystal display panel.

The plurality of liquid crystal cells are arranged on the liquid crystal display panel at locations where gate lines cross data lines. Electric fields may be applied to the layer of liquid crystal material via pixel and common electrodes arranged on the liquid crystal display panel. Each pixel electrode is connected to a data line via source and drain electrodes of switching devices such as thin film transistors. Gate electrodes of each thin film transistor are connected to corresponding gate lines and allow pixel voltage signals to be selectively applied to corresponding pixel electrodes.

The driving circuit includes a gate driver for driving the gate lines, a data driver for driving data lines, a timing controller for controlling the gate driver and the data drivers, and a power converter for generating various DC voltages used in the liquid crystal display. The timing controller controls the gate and data drivers by controlling a driving timing of the gate and data drivers and by applying pixel data signals to the data driver. The power converter generates a common voltage (Vcom), a gate high voltage (Vgh) and a gate low voltage (Vgl), etc. needed in the liquid crystal display. The gate driver sequentially applies scanning signals to the gate lines to sequentially drive the liquid crystal cells on the liquid crystal display one line at a time. The data driver supplies pixel voltage signals to each data line whenever the scanning signal is supplied to any one of the gate lines. Accordingly, LCDs control light transmittance characteristics of liquid crystal material using electric fields applied between pixel and common electrodes in accordance with pixel voltage signals specific to a liquid crystal cell.

Gate and data drivers are directly connected to the liquid crystal display panel and are integrated into a plurality of integrated circuits (ICs). Each of the gate driver ICs and data driver ICs are mounted to the liquid crystal display panel using tape carrier package (TCP) or chip on glass (COG) techniques. Further TCP-type gate and data driver ICs are connected to the liquid crystal display panel via a tape automated bonding (TAB) technique.

TCP-type gate and data driver ICs, connected to the liquid crystal display panel by the TAB technique, receive control signals and direct current (DC) voltage signals transmitted over signal lines provided on a printed circuit board (PCB). For example, each of the data driver ICs are connected to each other in series through the signal lines mounted on the data PCB, receive control signals and pixel data signal from the timing controller, and direct current voltage signals from the power converter. Gate driver ICs are connected to each other in series, via signal lines mounted on a gate PCB, receive control signals from the timing controller, and receive driving voltages from the power supply.

Driver ICs mounted on the liquid crystal display panel by a COG method are connected to each other by a line-on-glass (LOG) method. Mounted on a lower glass substrate of the liquid crystal display panel, the signal lines are formed using the LOG technique to receive control signals from the timing controller and power converter and driving voltages from the power converter.

Recently, the LOG method has been utilized when the driver ICs are connected to the liquid crystal display panel by the TAB technique. For example, the gate driver ICs are connected in series by the LOG method, thereby eliminating the gate PCB. In other words, the TAB-type gate driver ICs are connected in series through the signal lines mounted on the lower glass. In this case, one or more the LOG type signal lines, where the gate driver ICs are connected in series, overlaps with a sealant used for joining an upper and a lower substrate of the liquid crystal display panel together. However, a problem occurs as the ultraviolet UV rays irradiated for hardening the sealant is reflected by the signal lines arranged over the sealant, thereby generating a lack of hardening. Such a problem will be more particularly explained, as follows, in reference to FIGS. 1 to 3.

FIG. 1 illustrating a plan view structure of a related art LOG type liquid crystal display.

Referring to FIG. 1, the liquid crystal display includes a liquid crystal display panel 2, a plurality of data TCPs 4 connected between the liquid crystal display panel 2 and a data PCB 8, a plurality of gate TCPs 10 connected to the other side of the liquid crystal display panel 2, a plurality of data driver ICs 6 mounted on each data TCP 4, and a plurality of gate driver ICs 12 mounted on each gate TCP 10.

Liquid crystal cells are located in the picture display area 16 at every area where the gate and data lines cross each other. A picture is displayed in accordance with a pixel voltage signals. In the outer area of the picture display area 16 are located data pads connected to the data TCP 4, data links connecting the data pads with the data lines, gate pads connected to the gate TCP 10, and gate links connecting the gate pads with the gate lines. Additionally, LOG type signal line group 14 located in the outer area are mounted on the lower substrate for connecting in series the gate driver ICs 12 mounted on the gate TCP 10. For example, the LOG type signal line group 14 is located between the first data TCP 4 and the first gate TCP 10. The LOG type signal line group supplies gate control signals and direct current voltage signals supplied from the outside via the data PCB to the first data TCP 4 to the first gate TCP 10. Each of the signal lines included in the LOG type signal line group 14 supply direct current (DC) voltage signals, for example, gate high voltage signals (Vgh), gate low voltage signals (Vgl), common voltage signals (Vcom), and etc. Additionally, control signals such as a gate start pulse (GSP), a gate enable signal (GOE), and etc. are supplied.

The data PCB 8 supplies control and direct current voltage signals supplied from the timing controller and the power converter to the data driver IC 6 through each signal line. Also, the data PCB 8 supplies control signals and direct current voltage signals from the timing controller to the gate driver IC 12 to the first data TCP 4 through each signal line.

The data TCP 4 is electrically connected to the data pads provided at the upper part of the liquid crystal display panel 2 and the data TCP 4 is electrically connected to the output pads provided at the data PCB 8. The data driver ICs 6 convert the pixel data signals (digital signals) into pixel voltage signals (analog signals) to supply to data lines on the liquid crystal display panel 2.

The gate TCP 10 is electrically connected to the gate pads provided at one side of the liquid crystal display panel. The gate driver ICs 12 respond to input gate signals, for example, gate high voltage signals (Vgh) sequentially supplied to the gate lines. Also, gate driver ICs 12 supply the gate low voltage signals (Vgl) to the gate lines in the other periods except the period when the gate high voltage signals (Vgh) are supplied.

Referring to FIG. 2, at least one of the signal lines among the plurality of the LOG signal lines group 14 connected to the gate driver ICs 12, overlaps with an area where a sealant 30 is spread for joining the upper and the lower substrates. The LOG type signal lines 20, 22, 24, and 26 are made of a gate metal material. Additionally, the general gate pads 32 and 34 are made of a gate metal material.

The LOG type signal line 20 is arranged over the sealant 30 and blocks UV rays irradiated from a lamp 36. The UV rays are utilized for hardening the sealant 30, however, when the UV rays are block the sealant 30 is not hardened.

Generally, the sealant 30 is spread at the outer area of the lower substrate 18 and used in initially joining the upper and lower substrates together. Next, UV rays irradiated from the rear of the lower substrate 18, thereby completely joining the upper and the lower substrates as the sealant 30 is hardened. UV rays are not irradiated from the front of the upper substrate as a color filter spread on the upper substrate blocks the transmission of UV rays. Additionally, when the UV rays are irradiated from the rear of the lower substrate 28 the LOG signal lines block some of the UV rays. The portion of the sealant 30 that has not received the UV rays is not hardened completely and reacts with the liquid crystal interposed inside of the sealing area. As a result, a stain is generated at the side surface of the picture display area 16.

SUMMARY OF THE INVENTION

Accordingly, the present invention is directed to a line-on-glass LOG type liquid crystal display panel that is capable of preventing the problems in the related art. The present invention is directed to preventing the lack of hardening of a sealant and substantially obviating one or more of the problems due to limitations and disadvantages of the related art.

To achieve these and other advantages and in accordance with the purpose of the present invention, as embodied and broadly described, the present invention provides a liquid crystal display panel of a line-on-glass type having a plurality of liquid crystal cells formed between an upper substrate and a lower substrate. Signal pads formed at the outer area of the picture display part for supplying driving signals inputted from an outer driver integrated circuit to a picture display part. Line-on-glass type signal lines formed at the outer area by a line-on-glass method for supplying voltage signals needed for driving the driver integrated circuit. A sealant spread on the outer area for joining the upper and lower substrates and at least one or more holes formed in the line-on-glass signal lines at an area where the line-on-glass type signal lines overlap with the sealant. The holes allow irradiated UV rays to pass through and substantially harden the sealant under the line-on-glass type signal lines.

According to an aspect of the invention, the line-on-glass type signal lines connect the gate driver integrated circuits in series. The gate driver integrated circuits drive gate lines of the picture display part. The line-on-glass signal lines supply control signals and direct current voltage signals needed for driving the gate driver integrated circuit at the same time. Additionally, they supply common voltage signals to a common electrode formed at the upper substrate.

Accordingly, in yet another aspect of the invention, the line-on glass type signal lines further includes signal lines formed between a tape carrier package where the data driver integrated circuit is mounted for driving data lines of the picture display part and a tape carrier package where the gate driver integrated circuit is mounted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
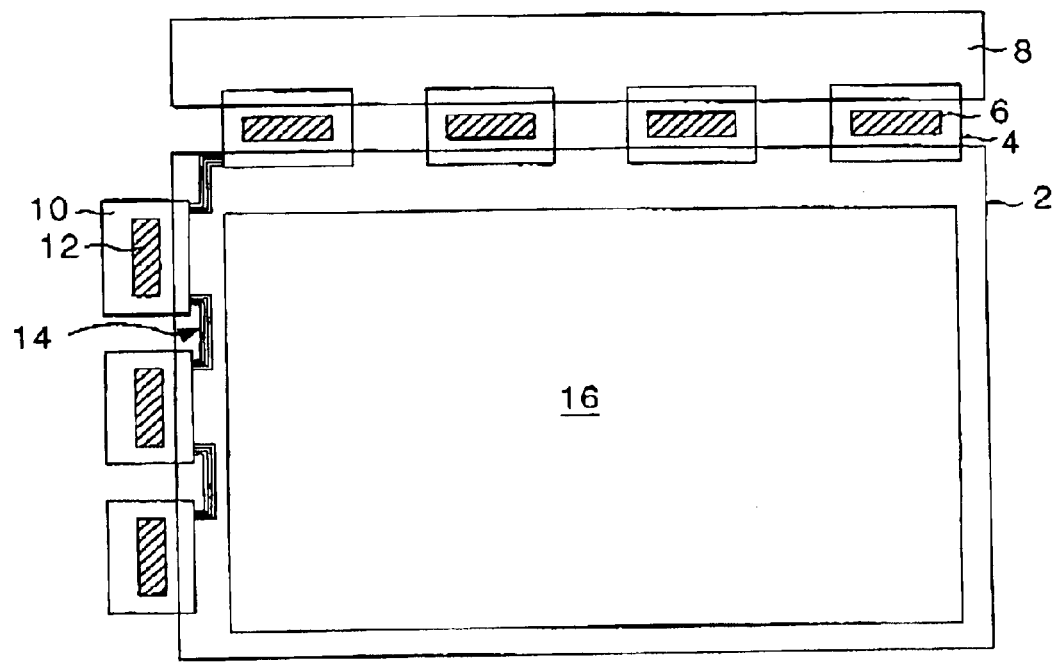
FIG. 1 illustrates a plan view line-on-glass type liquid crystal display panel of the related art.
Figure 2:
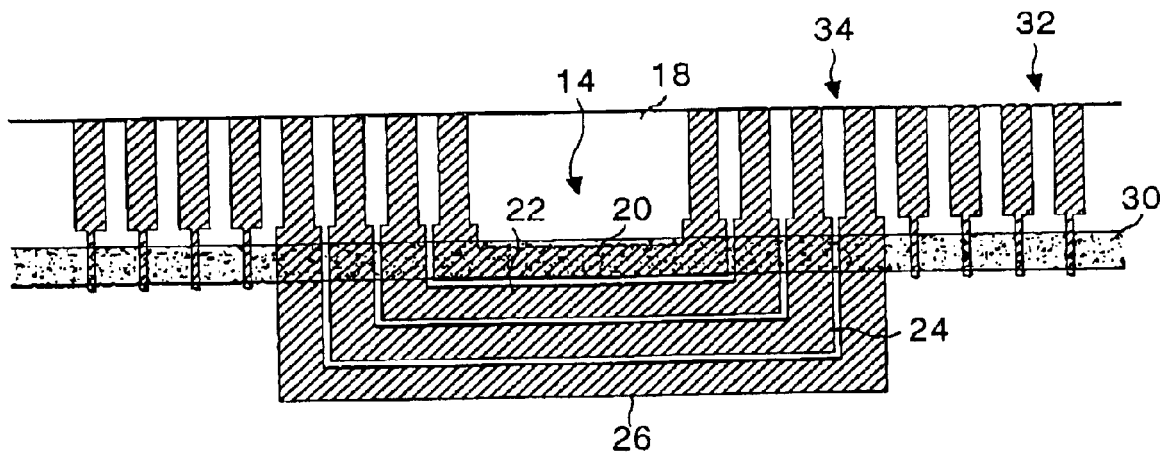
FIG. 2 illustrates an enlarged view of line-on-glass type signal lines shown in FIG. 1 of the related art.
Figure 3:
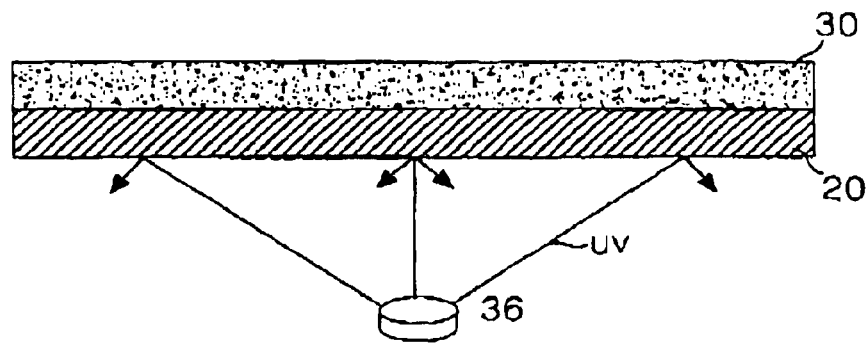
FIG. 3 illustrates UV ray progress path for hardening a sealant shown in FIG. 2 of the related art.
Figure 4:
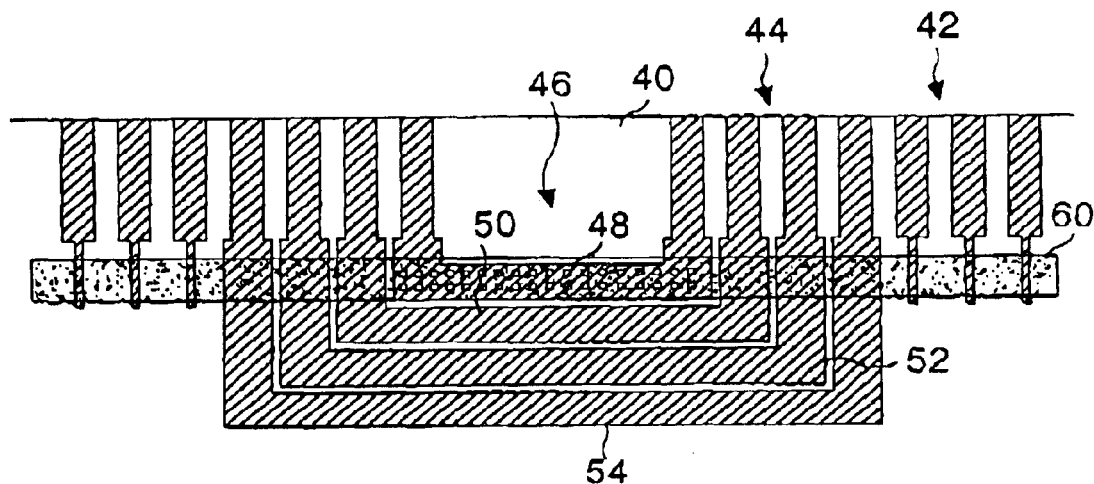
FIG. 4 illustrates an enlarged view of line-on-glass type signal lines according to an embodiment of the present invention.
Figure 5:
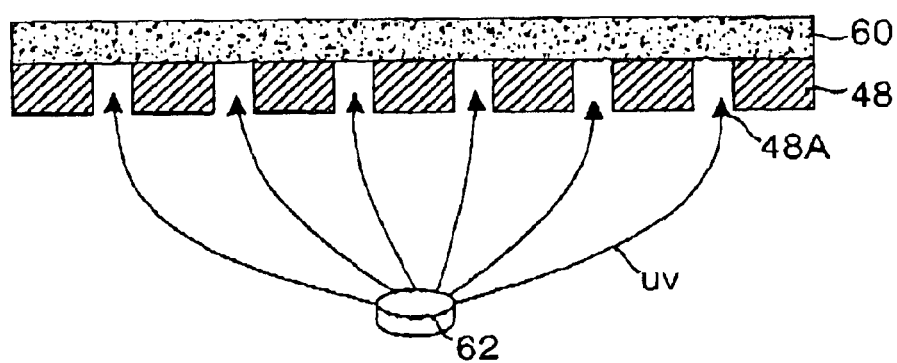
FIG. 5 illustrates an enlarged view of a UV ray progress path for hardening a sealant shown in FIG. 4 according to an embodiment of the present invention.

With reference to FIGS. 4 and 5 embodiments of the present invention will be explained as follows.

FIG. 4 illustrates an enlarged view of line-on-glass type signal lines according to an embodiment of the present invention.

Referring to FIG. 4, a plurality of LOG type signal line groups 46 are formed on a lower substrate 40 together with gate pads 42 and pads 44 of the plurality of LOG type signal line groups 46. The plurality of the LOG type signal line groups 46 are formed of gate metal material. Additionally, the general gate pads 42 and pads 44 are formed of the same gate metal material. The LOG type signal line group 46 connects in series to gate driver ICs connected to gate pads 42 through a gate TCP by a TAB method. The LOG type signal line group supplies control signals and direct current voltage signals needed for a driving the gate driver IC. One of the LOG type signal lines of the LOG type signal line group 46 supplies a common voltage to a common electrode formed on an upper substrate. For example, the LOG type signal line group 46 supplies gate control signals and direct current voltage signals supplied from the outside via data PCB and first data TCP to the first gate TCP. Each of the signal lines 48, 50, 52, and 54 included in the LOG type signal line group 46 supplies the direct current voltage. For example, the signal lines supply signals, such as, gate high voltage signals (Vgh), gate low voltage signals (Vgl), and common voltage signals (Vcom). Additionally, control signals are supplied, such as, a gate start pulse signal (GSP), a gate enable signal (GOE), and etc.

At least one LOG type signal line 48 among a plurality of LOG type signal lines 48, 50, 52, and 54 overlaps with the area where a sealant 60 is spread for joining the upper and lower substrates. A plurality of holes 48a are formed in the LOG type signal line 48 that is arranged over the sealant 60. As a result, the holes 48a allow UV rays irradiated from a lamp 62 to harden the sealant. Accordingly, as shown in FIG. 5, the sealant 60 may be substantially hardened.

The sealant 60 is spread at the outer area of the lower substrate 40 and is hardened by the UV rays irradiated from the rear of the lower substrate 40, thereby joining the upper and lower substrates. According to the present invention, the UV rays irradiated pass through the holes 48a of the LOG type signal line 48 and the rays substantially harden the sealant 60 that is overlapped with the LOG type signal line 48. As a result, the UV rays obviate one or more of the problems with related art. UV rays are not irradiated from the front of the upper substrate because the color filter spread on the upper substrate prevents the transmission of UV rays.

As described above, a plurality of holes are formed in the LOG type signal lines that overlap the sealant. Thereby, the UV rays pass through the holes to the sealant and substantially harden the sealant that is overlapped with the LOG type signal lines. Accordingly, it is possible to prevent the occurrence of stain in the picture display area and prevent obviate other problems associated with the related art.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A line-on-glass type liquid crystal display, comprising:
    a picture display part having a plurality of liquid crystal cells formed between an upper and lower substrates;
    signal pads formed at the outer area of the picture display part for supplying driving signals inputted from an outer driver integrated circuit to the picture display part;
    a plurality of line-on-glass type signal lines formed at the outer area for supplying voltage signals needed for driving a gate driver integrated circuits;
    a sealant formed on the outer area for joining the upper and lower substrates; and
    at least one or more holes formed in at least one of the plurality of line-on-glass type signal lines for allowing UV rays to pass through the at least one of the line-on-glass type signal lines, wherein the UV rays substantially harden the sealant.

2. The line-on-glass type liquid crystal display of claim 1, wherein the plurality of line-on-glass type signal lines connect the gate driver integrated circuits in series.

3. The line-on-glass type liquid crystal display of claim 2, wherein the plurality of line-on-glass type signal lines supply control signals, direct current voltage signals for driving the gate driver integrated circuit, and simultaneously supply common voltage signals to common electrodes formed on the upper substrate.

4. The line-on-glass type liquid crystal display of claim 2, wherein the plurality of line-on-glass type signal lines are formed between gate driver integrated circuits mounted on tape carrier packages.

5. The line-on-glass type liquid crystal display of claim 3, wherein the plurality of line-on-glass type signal lines further includes:
    signal lines formed between a data driver integrated circuit mounted on tape carrier packages, wherein the data driver for driving data lines of the picture display part; and
    a gate driver integrated circuit mounted on a tape carrier package.

6. A line-on-glass type liquid crystal display, comprising:
    an upper and lower substrate;
    a picture display part having a plurality of liquid crystal cells formed between the upper and lower substrates;
    a plurality of line-on-glass type signal lines formed at the outer area for supplying voltage signals needed for driving the driver integrated circuit;
    a sealant formed on the outer area for joining the upper and lower substrates; and
    at least one or more holes formed in at least one of the plurality of line-on-glass type signal lines, wherein the at least one of the line-on-glass type signal lines is arranged over the sealant.

7. A line-on glass type liquid crystal display, comprising:
    a plurality of line-on-glass type signal lines formed at the outer area for supplying voltage signals needed for driving an integrated circuit;
    a sealant formed on the outer area for joining an upper and lower substrates; and
    at least one or more holes formed in at least one of the plurality of line-on-glass type signal lines for allowing UV rays to pass through the at least one of the line-on-glass type signal lines and substantially harden the sealant.

8. The line-on glass type liquid crystal display of claim 7, wherein the integrated circuit includes a gate driver integrated circuits.

9. The line-on glass type liquid crystal display of claim 8, wherein the gate driver integrated circuits are connected in series with the line-on-glass type signal lines.

10. The line-on glass type liquid crystal display of claim 9, further including a picture display part having a plurality of liquid crystal cells formed between an upper and lower substrates; and
    signal pads formed at the outer area of the picture display part for supplying driving signals inputted from an outer driver integrated circuit to the picture display part.

* * * * *